United States Patent
Callahan et al.

(10) Patent No.: US 7,493,684 B1
(45) Date of Patent: Feb. 24, 2009

(54) METHOD OF LOADING AN ARTICLE TO AN EXTERIOR OF AN AIRCRAFT

(75) Inventors: Robert Callahan, Mesa, AZ (US); William N. York, Scottsdale, AZ (US); Daniel Guy Drummond, Higley, AZ (US)

(73) Assignee: Robertson Aviation LLC, Tempe, AZ (US)

( * ) Notice: Subject to any disclaimer, the term of this patent is extended or adjusted under 35 U.S.C. 154(b) by 684 days.

(21) Appl. No.: 11/074,478

(22) Filed: Mar. 8, 2005

Related U.S. Application Data

(62) Division of application No. 10/869,116, filed on Jun. 16, 2004, now Pat. No. 7,104,503.

(51) Int. Cl.
*B23P 19/00* (2006.01)
(52) U.S. Cl. .................................... 29/426.3
(58) Field of Classification Search .............. 29/426.3, 29/426.1, 428, 468, 281.1, 822; 244/137, 244/137.1, 137.4; 89/45, 46, 1.51; 414/340
See application file for complete search history.

(56) References Cited

U.S. PATENT DOCUMENTS 6,123,495 A * 9/2000 Callahan et al. ............. 414/340

* cited by examiner

*Primary Examiner*—John C Hong
(74) *Attorney, Agent, or Firm*—Parsons & Goltry; Robert A. Parsons; Michael W. Goltry

(57) ABSTRACT

Aircraft loading apparatus includes a frame removably attachable to an aircraft (e.g., a helicopter). The frame is constructed for assembly and disassembly in a transitional position and includes a pair of raising and lowering mechanisms. The mechanisms include a pair of belts with free ends attachable to form a sling and connected for simultaneous extension or retraction of equal lengths of each belt. In operation, the frame is attached to the aircraft adjacent an area at which an article (e.g. an auxiliary fuel tank) is to be connected. The article is positioned under the frame and the belts are extended to form a sling around the article. The mechanisms are activated to simultaneously retract equal lengths of each belt to raise the article into a connecting position, the article is connected, and the frame is disassembled into a removable configuration and removed from the aircraft.

6 Claims, 3 Drawing Sheets

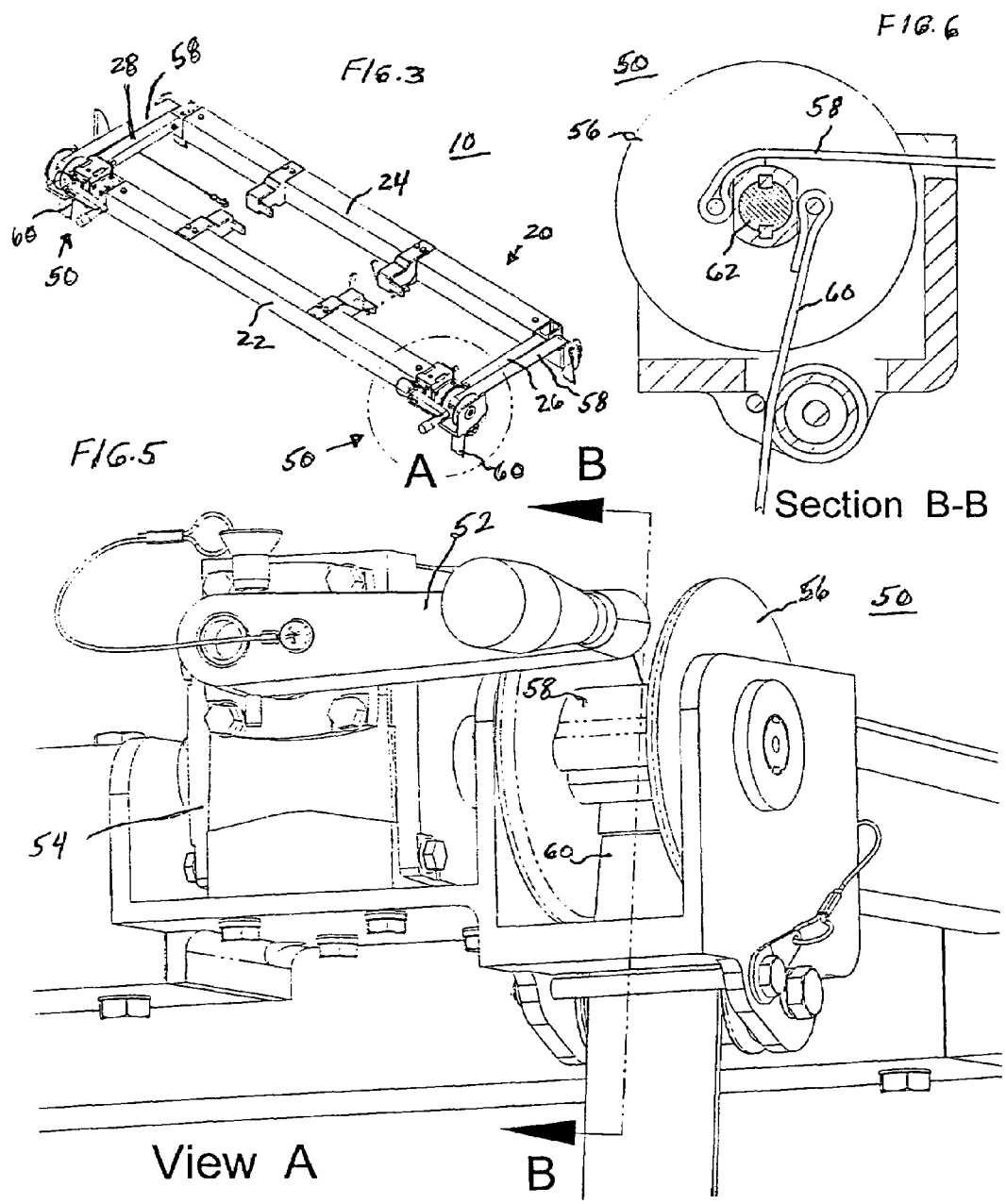

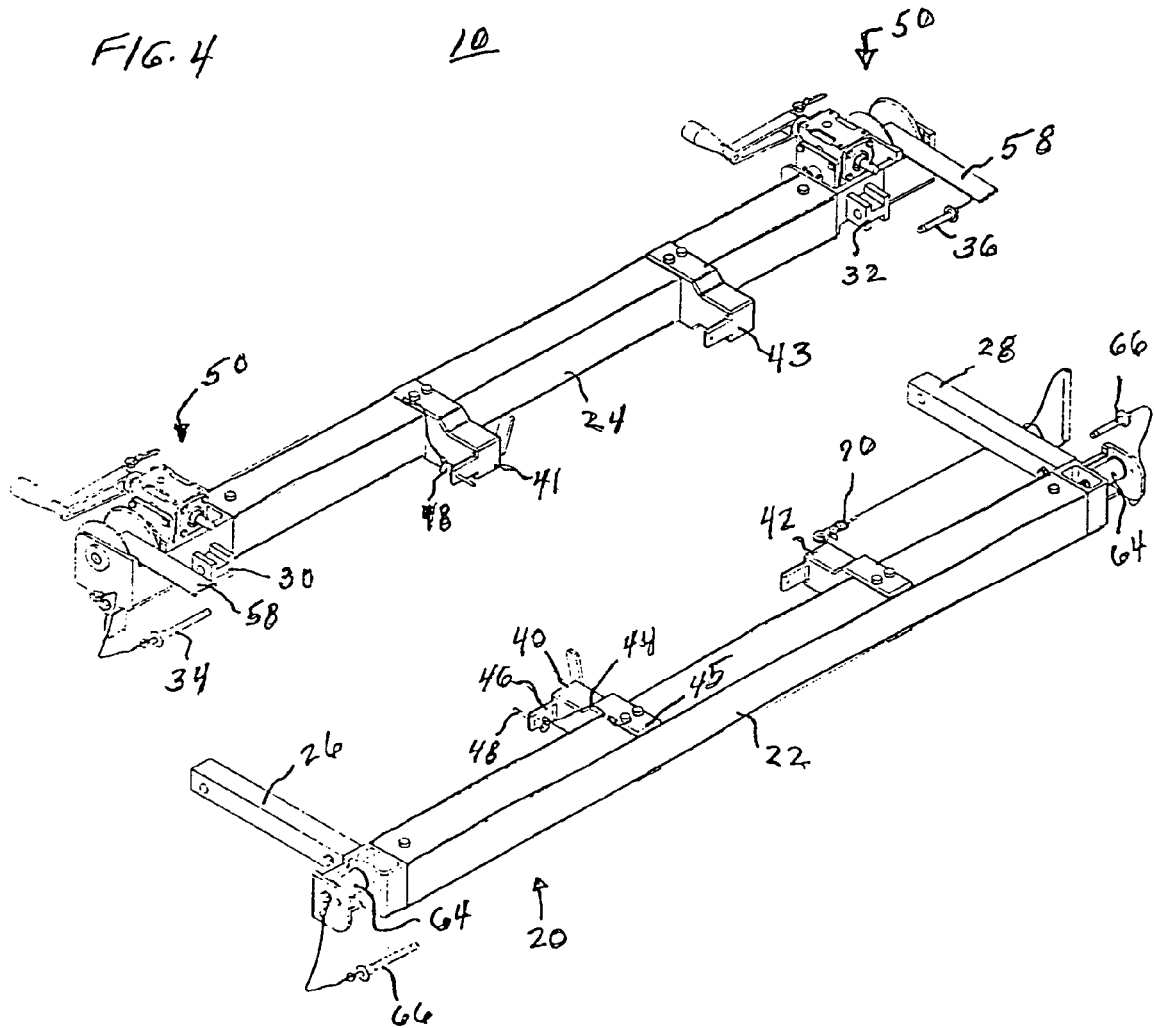

METHOD OF LOADING AN ARTICLE TO AN EXTERIOR OF AN AIRCRAFT

CROSS-REFERENCE TO RELATED APPLICATIONS

This application is a divisional of U.S. patent application Ser. No. 10/869,116, filed Jun. 16, 2004 now U.S. Pat. No. 7,104,503.

FIELD OF THE INVENTION

This invention relates to apparatus for loading or mounting and dismounting fuel tanks, munitions, and the like on aircraft and, more particularly, for loading or mounting and dismounting fuel tanks on helicopters.

BACKGROUND OF THE INVENTION

In the use of aircraft, and particularly helicopters and the like, it is often desirable to mount auxiliary or additional fuel tanks, munitions (e.g. bombs and other heavy articles), etc. under the wings or bodies. Generally, these articles are extremely heavy and, in most instances, cannot be attached by individuals or even groups of individuals. For example, fuel tanks for helicopters can weigh hundreds of pounds, even empty. Further, in many instances there is insufficient room for a wheeled vehicle or the like to carry the article into position under the vehicle and then lift it into position. Also, positioning of the articles under the aircraft must be very precise, since the articles are generally attached to the aircraft by a pin or pins extending through two or more yokes or other mounting assemblies on the underside of the aircraft and mating hooks or eyes on the upper side of the article. Here it should be understood that the term "underside" includes any portion of an aircraft from which external or auxiliary articles are attached or hung. Thus, apparatus for loading, mounting, or installing (and removing) these generally very heavy articles must be capable of very precisely positioning and lifting the articles into the correct orientation in a relatively small space.

Some limited use has been made of wheeled vehicles with a hydraulic bed that is capable of moving vertically. However, such vehicles are extremely expensive and can be very difficult to use in correctly orienting the articles for attachment to the aircraft, as well as being too large in many instances to fit conveniently under many aircraft, such as helicopters and the like. It will be understood that discussions of loading apparatus in this disclosure refers to apparatus that is capable of not only positioning articles for loading, mounting, or installing on aircraft but also can be used for the removal of the article after use (e.g. empty auxiliary fuel tanks, etc.).

It would be highly advantageous, therefore, to remedy the foregoing and other deficiencies inherent in the prior art.

Accordingly, it is an object of the present invention to provide new and improved aircraft loading apparatus.

Another object of the present invention is to provide new and improved aircraft loading apparatus that is inexpensive to manufacture and, consequently, to purchase and use.

Another object of the present invention is to provide new and improved aircraft loading apparatus that is easy to use and can be used in virtually any situation (e.g. under virtually any aircraft).

Another object of the present invention is to provide new and improved aircraft loading apparatus that correctly orients an article under an aircraft and raises it into position for attachment with minimum effort on the part of the operator.

Another object of the present invention is to provide new and improved aircraft loading apparatus that provides enhanced ground crew safety during loading and unloading operations.

SUMMARY OF THE INVENTION

Briefly, to achieve the desired objects of the instant invention in accordance with a preferred embodiment thereof, aircraft loading apparatus is described that includes a frame removably attachable to an aircraft. The frame is constructed for assembly and disassembly in a transitional position into a removable configuration. Thus, the frame can be easily disconnected and removed after attachment of the article. At least one raising and lowering mechanism is affixed to the frame, the mechanism including a pair of belts with free ends of the belts being attachable together to form a sling. The pair of belts and the raising and lowering mechanism are connected for simultaneous extension or retraction of equal lengths of each belt so that the article can be raised or lowered vertically without rotating the article.

In a preferred embodiment of the apparatus and method of use, aircraft loading apparatus is provided that includes a frame removably attachable to an aircraft (e.g. a helicopter). The frame is constructed for assembly and disassembly in a transitional position and includes a pair of raising and lowering mechanisms. The mechanisms each include a pair of belts with free ends attachable to form a pair of slings. The mechanisms and belts are connected for simultaneous extension or retraction of equal lengths of each belt. In operation, the frame is attached to the aircraft adjacent to an area at which an article (e.g. an article fuel tank) is to be connected. The article is positioned under the frame and the belts are extended to form a pair of slings around the article. The mechanisms are activated to simultaneously retract equal lengths of each belt to raise the article into a connecting position, the article is connected, and the frame is disassembled into a removable configuration and removed from the aircraft.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 3 is a perspective view of the aircraft loading apparatus of FIG. 1;

FIG. 4 is an exploded perspective view of the aircraft loading apparatus of FIG. 1, in a disassembled mode;

FIG. 5 is an enlarged perspective view of a raising and lowering mechanism, designated as portion A in FIG. 3, incorporated in the aircraft loading apparatus of FIG. 1; and FIG. 6 is a sectional view as seen from the line B-B in FIG. 5.

DETAILED DESCRIPTION OF THE DRAWINGS

Figures 1, 2:
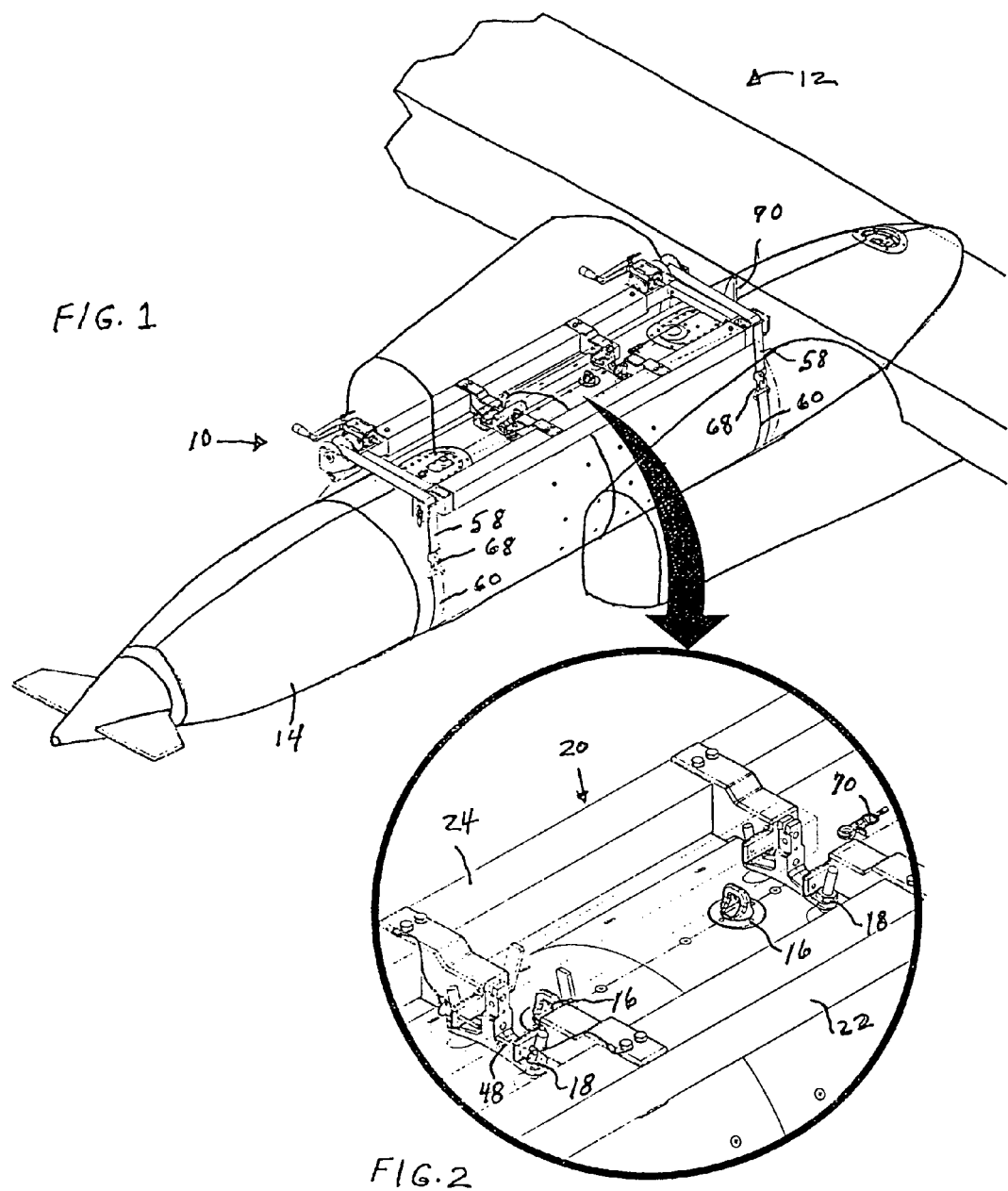
FIG. 1 is a perspective view of aircraft loading apparatus positioned under an aircraft and holding an auxiliary fuel tank in loading position, in accordance with the present invention.
FIG. 2 is an enlarged perspective view of a designated portion of the aircraft loading apparatus of FIG. 1, illustrating orientation structure incorporated in the apparatus.

Turning now to the drawings in which like characters indicate like parts throughout the various figures, FIG. 1 illustrates aircraft loading apparatus 10, in accordance with the present invention, positioned under an aircraft 12 (illustrated in phantom for ease in viewing apparatus 10) and holding an auxiliary fuel tank 14 in loading position. It will be understood that discussions of loading and/or loading apparatus in this disclosure refers to apparatus that is capable of not only positioning articles for loading, mounting, or installing on aircraft but also can be used for the removal of the article after use (e.g. empty auxiliary fuel tanks, etc.). Also, in this description, the H-60 Blackhawk Helicopter and an auxiliary fuel tank constructed to be mated with that aircraft are used as an example for purposes of a complete description of the invention. It will be understood, however, from the present description that the aircraft loading apparatus of the present invention can be used with other aircraft and mating articles.

In this specific example, auxiliary fuel tank 14 includes a pair of upwardly extending eye attachments 16 spaced longitudinally apart on the upper surface. Attachments 16 are fixedly connected to auxiliary fuel tank 14 in a well known manner so that it can be safely carried by attachments 16. Aircraft 12 has a pair of feet assemblies 18 affixed to its underside (or the underside of its wings) to engage the upper surface of auxiliary fuel tank 14 and prevent rotary or lateral movement once auxiliary fuel tank 14 is fixedly attached to the underside or wings of aircraft 12. Each of the pair of feet assemblies 18 is formed in a generally inverted T-shape with the upper end of the trunk attached to aircraft 12 and an adjustable foot extending downwardly from adjacent each end of the cross bar. Each adjustable foot is formed on an elongated threaded shaft (which provides the adjustability) that extends upwardly from each end of the cross bars of the inverted T-shaped assemblies. The pair of feet assemblies 18 are longitudinally spaced apart so as to be positioned forward and aft, respectively, of attachments 16 when auxiliary fuel tank 14 is correctly positioned relative to aircraft 12. A longitudinally extending, spring loaded rod (not shown for convenience of illustration) attached to the underside of aircraft 12, is positioned to be engaged through attachments 16 to hold auxiliary fuel tank 14 fixedly engaged under aircraft 12 in a well known manner.

Referring additionally to FIGS. 2, 3, and 4, aircraft loading apparatus 10 can be seen in detail. Apparatus 10 includes a frame 20, which in this embodiment is formed with a pair of longitudinally extending members 22 and 24 held in a laterally spaced apart position by a pair of cross-members 26 and 28. Members 22 and 24 and cross-members 26 and 28 cooperate to form generally rectangularly shaped frame 20. It will be understood that in this preferred embodiment the four members forming frame 20 are considered sufficiently strong to perform the desired task while being simple enough to be easily maneuverable and relatively inexpensive to manufacture. However, in other applications it may be desirable to include more or less supporting members or to form the frame in different embodiments for specific tasks.

As can be seen best in FIG. 4, one of the ends of each of the cross-members 26 and 28 is fixedly attached to member 22, adjacent each end of member 22. The opposite end of each cross-member 26 and 28 is removably attached to member 24, adjacent each end of member 24. In this embodiment, short lengths of I-beam shaped couplings 30 and 32 which can be engaged or inserted into the opposite ends, respectively, of each cross-member 26 and 28 are provided. One end of each coupling 30 and 32 is attached to the side of member 24, by welding or the like, and the other end extends laterally outwardly so as to be free to be inserted into the free ends of cross-members 26 and 28, respectively. Holes are provided through cross-members 26 and 28 and through each coupling 30 and 32 so that once the free ends of cross-members 26 and 28 are engaged over couplings 30 and 32, respectively, pins 34 and 36 are inserted to hold frame 20 fixedly in the assembled mode, as illustrated in FIG. 3. The main purpose of the ability to disassemble frame 20 will be described in more detailed below.

Members 22 and 24 of frame 20 also carry four inwardly projecting connecting members 40-43 for positioning and removably attaching frame 20 to the underside of aircraft 12. Each connecting member 40-43 includes an elongated body 44 formed in the shape of a yoke 45 at one end to receive either member 22 or 24 therein and a finger 46 at the inner or opposite end. Finger 46, of each connecting member 40-43 is formed perpendicular to body 44 so as to extend longitudinally within frame 20. Arms of yoke 45 of each connecting member 40-43 are positioned above and below the associated member 22 or 24 and bolted thereto so that frame 20 can be firmly and ruggedly supported by connecting members 40-43.

As can best be seen in FIG. 2, once assembled, frame 20 is raised into a transitional position adjacent the underside of aircraft 12 and moved rearwardly toward an attached position in which fingers 46 are engaged with the cross bar of each inverted T-shaped feed assembly 18. Fingers 46 slide between the body of the T-shaped assembly and the upwardly extending shafts of the adjustable feet so that lateral movement is prevented. Also, pins 48 are provided to be positioned in holes through fingers 46 on connecting members 40 and 41 to capture the upwardly extending shafts of the adjustable feet and prevent longitudinal movement once frame 20 is correctly oriented in the attached position relative to aircraft 12. It will of course be understood that more or less pins 48 could be used if desired or other means for locking aircraft loading apparatus 10 onto aircraft 12 could be used. Thus, aircraft loading apparatus 10 is fixedly attached to aircraft 12 and locked in the attached position to ensure a safe installation of auxiliary fuel tank 14.

A raising and lowering mechanism 50 is provided at each end of member 24 of frame 20. Enlarged views of mechanism 50 are provided in FIGS. 5 and 6 for a better understanding of the operation. In this embodiment, a handle or crank 52 is coupled through a gear box 54 to a spool or pulley 56. It will of course be understood that one or two electric motors could be used in place of cranks 52, as mechanisms 50, for simultaneous operation by a single operator. As can best be seen in FIG. 6, one end of each of a pair of belts 58 and 60 are attached to the sides of pulley 56 on opposite sides of a central mounting shaft 62. Here it will be understood that the term "belt" is intended to include any form of flexible material (e.g. fiber belt, nylon belt, wire, cable, rope, etc.) that can perform the function described. Thus, as crank 52 is rotated in one direction, pulley 56 is rotated (e.g. counterclockwise in FIG. 6) and equal lengths of belts 58 and 60 are wound around shaft 62. Crank 52 can then be rotated in the opposite direction to unwind belts 58 and 60. Gear box 54 is included to provide a mechanical average or gear reduction so that crank 52 can be easily turned while raising articles with a relatively large weight. In this embodiment, two mechanisms 50, each with a crank 52, are included but it will be understood that a single crank might operate both mechanisms or other raising and lowering mechanisms might be included.

As can be seen in FIG. 4, each of the opposite ends of member 22 of frame 20 are provided with a longitudinally extending, guide or free roller 64 positioned to have belt 58 of mechanism 50 extended thereover. In the extended or operating mode, belt 58 extends horizontally from pulley 56 over roller 64 and then vertically downward. Also, a pin 66 is associated with each roller 64 to be inserted in a mating opening, after belt 58 is correctly positioned on roller 64, to capture belt 58 and prevent it from inadvertently coming off roller 64 during operation. Further, in the extended or operating mode, belt 60 extends downwardly, directly from pulley 56. The free ends of belts 58 and 60 are fitted with a convenient clasp or connecting arrangement 68, such as the hook and loop illustrated in FIG. 1, so they may be conveniently connected together.

Thus, in operation, frame 20 is assembled, as illustrated in FIG. 3. Aircraft loading apparatus 10 is then raised to the transitional position, moved rearwardly to the attached position, and locked onto aircraft 12, as illustrated in FIG. 1. Belts 58 in each mechanism 50 are extended over rollers 64, pins 66 are inserted, and both belts 58 and 60 are extended vertically downwardly. Auxiliary fuel tank 14 is positioned below aircraft 12, belt 60 is extended under auxiliary fuel tank 14 and up along the opposite side, where the free end is attached to the free end of belt 58. Thus, belts 58 and 60, associated with each mechanism 50, form a sling for raising or lowering articles, such as auxiliary fuel tank 14. Crank 52 is operated to simultaneously wind equal lengths of both belts 58 and 60 around shaft 62. As crank 52 is rotated to take in belts 58 and 60, auxiliary fuel tank 14 will be smoothly raised into position below aircraft 12.

Preferably, both cranks 52 of both mechanisms 50 are operated substantially together for the smooth raising (or lowering) of auxiliary fuel tank 14 while maintaining it substantially horizontal. Further, since belts 58 and 60 on each mechanism 50 are automatically cranked in equal lengths, auxiliary fuel tank 14 is raised or lowered vertically without imparting any rotary movement (about the longitudinal axis). As will be understood, any rotary movement of auxiliary fuel tank 14 would move eye attachments 16 out of position for receiving the spring loaded rod in locking engagement therewith.

A clasp, wire, and handle 70 are provided to conveniently withdraw the longitudinally extending, spring loaded rod (not shown) on the underside of aircraft 12 that holds eye attachments 16 in the correct or installed location. Clasp, wire, and handle 70 are used only to unlock the spring loaded rod for unloading a fuel tank that is locked in place. They are not used when installing auxiliary fuel tank 14 because the mounting rack remains in the 'open' position after a fuel tank is removed. That is the spring loaded rod remains in the unlocked or 'open' position until the next tank is loaded. Once auxiliary fuel tank 14 is fixedly locked in placed, belts 58 and 60 are disconnected from each other, pins 48 are removed, and frame 20 is moved to the transitional position where it can be disassembled into a removable configuration (in this embodiment, individually removable portions), as illustrated in FIG. 4, and easily removed from aircraft 12. With aircraft loading apparatus 10 removed, it can be easily stored or it can be quickly positioned on the next aircraft. Preferably, loading apparatus 10 includes a container (not shown) designed to store the apparatus in the assembled condition.

It will be understood by those skilled in the art that the term "a removable configuration" pertains to any adjustment or disassembly of the assembled structure (illustrated, for example, in FIG. 3) which allows the assembled structure to be moved out of the attached position and removed from the aircraft once the fuel tank is installed. For example, an embodiment might be devised wherein cross-member 26 is pinned at both ends and, therefore, removable to allow loading apparatus 10 to be moved forward beyond an installed fuel tank far enough the be completely removed from the aircraft. It will be understood that any adjustment or disassembly designed to achieve removable of the loading apparatus from the attached position with the article installed on the aircraft comes within the term "assembly and disassembly".

Thus, new and improved aircraft loading apparatus has been disclosed. The new and improved aircraft loading apparatus is relatively inexpensive to manufacture and, therefore, to purchase and is very easy and convenient to use. Also, the new and improved aircraft loading apparatus conveniently positions articles, such a auxiliary fuel tanks, armaments, and the like, relative to aircraft with a minimum of operators and labor. Further, because the frame is constructed for assembly and/or disassembly in a transitional position into a removable configuration the entire assembly can be easily removed from the aircraft after the article is installed, or it can be assembled over the article for disconnecting the article from the aircraft. It will be understood that two raising and lowering mechanisms with two spaced apart pairs of belts are disclosed as a preferred embodiment but in some specific applications a single mechanism and pair of belts might be used with an operator providing some degree of horizontal stability to the article.

Various changes and modifications to the embodiments herein chose for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of connecting an article to an exterior area of an aircraft comprising the steps of:
   providing aircraft loading apparatus including a frame removably attachable to the aircraft, the frame being constructed for assembly and disassembly in one of an attached position and a transitional position, the frame includes side members separated by cross-members, the cross-members removably attached to the side members, the frame is removably attachable to the aircraft by means of fingers attached to the side members in a horizontally extending orientation, and at least one raising and lowering mechanism affixed to the frame, the mechanism including a pair of belts with free ends attachable to form a sling, the pair of belts and associated mechanism being connected for simultaneous extension or retraction of equal lengths of each belt;
   attaching the frame of the aircraft loading apparatus adjacent the area of the aircraft at which the article is to be connected;
   positioning the article under the frame;

extending the belts around opposite sides of the article and attaching the free ends of the belts to form a sling around the article;

activating the raising and lowering mechanism to simultaneously retract equal lengths of each belt of the pair of belts to raise the article into a connecting position;

connecting the article to the exterior area of the aircraft; and disassembling the frame of the aircraft loading apparatus into a removable configuration and removing the frame from the aircraft.

2. A method as claimed in claim 1 wherein the step of providing aircraft loading apparatus includes providing apparatus with a pair of raising and lowering mechanisms attached in spaced apart relationship to the frame, each mechanism including a pair of belts, the step of extending the belts includes extending the belts of both pairs and attaching the free ends of the belts to form a pair of spaced apart slings around the article, and the step of activating the raising and lowering mechanism includes activating both mechanisms to simultaneously retract equal lengths of each belt of each of the two pairs of belts to raise the article into a connecting position.

3. A method as claimed in claim 1 wherein the step of attaching the frame includes attaching the frame to a helicopter and the step of positioning the article includes positioning an auxiliary fuel tank.

4. A method as claimed in claim 1 wherein the step of attaching the frame includes attaching the frame, moving the frame to the transitional position, and moving the frame to the attached position.

5. A method as claimed in claim 1 wherein the step of disassembling the frame includes moving the frame to the transitional position and separating the frame into individually removable portions.

6. A method as claimed in claim 1 including substantially reversing the steps to disconnect the article from the aircraft.

* * * * *